United States Patent
Rice et al.

(10) Patent No.: US 10,904,314 B2
(45) Date of Patent: Jan. 26, 2021

(54) ENDPOINT URL GENERATION AND MANAGEMENT

(71) Applicant: salesforce.com, inc., San Francisco, CA (US)

(72) Inventors: John Rice, Indianapolis, IN (US); Thomas B. Kashin, Indianapolis, IN (US); Venkatesh Baskar, Carmel, IN (US); Nathan Corn, Indianapolis, IN (US); Sangamesh Wadawadigi, Carmel, IN (US)

(73) Assignee: salesforce.com, inc., San Francisco, CA (US)

( * ) Notice: Subject to any disclaimer, the term of this patent is extended or adjusted under 35 U.S.C. 154(b) by 212 days.

(21) Appl. No.: 16/225,674

(22) Filed: Dec. 19, 2018

(65) Prior Publication Data

US 2020/0137138 A1 Apr. 30, 2020

Related U.S. Application Data

(60) Provisional application No. 62/753,641, filed on Oct. 31, 2018.

(51) Int. Cl.
*G06F 15/16* (2006.01)
*H04L 29/08* (2006.01)
*G06F 16/957* (2019.01)
*H04L 9/06* (2006.01)
*G06F 16/955* (2019.01)

(52) U.S. Cl.
CPC .......... *H04L 67/02* (2013.01); *G06F 16/9566* (2019.01); *G06F 16/9577* (2019.01); *H04L 9/0643* (2013.01)

(58) Field of Classification Search
CPC ... H04L 67/02; H04L 9/0643; G06F 16/9566; G06F 16/9577
USPC .......................................................... 709/203
See application file for complete search history.

(56) References Cited

U.S. PATENT DOCUMENTS

| | | | | |
|---|---|---|---|---|
| 9,712,520 B1* | 7/2017 | Canavor | ................. | H04L 67/14 |
| 9,934,394 B1* | 4/2018 | Stolboushkin | ...... | G06F 21/6218 |
| 2010/0211448 A1* | 8/2010 | Beenau | ................. | H04L 63/045 |
| | | | | 705/14.23 |
| 2011/0145435 A1* | 6/2011 | Bhatawdekar | .......... | G06F 21/64 |
| | | | | 709/238 |
| 2012/0253814 A1* | 10/2012 | Wang | .................. | G06F 16/9577 |
| | | | | 704/260 |
| 2012/0303830 A1* | 11/2012 | Tobioka | .................. | G06F 21/31 |
| | | | | 709/229 |
| 2012/0331529 A1* | 12/2012 | Ibel | ..................... | G06F 21/6218 |
| | | | | 726/4 |
| 2013/0080507 A1* | 3/2013 | Ruhlen | ................... | H04L 67/16 |
| | | | | 709/203 |

(Continued)

*Primary Examiner* — Hannah S Wang
(74) *Attorney, Agent, or Firm* — Butzel Long

(57) ABSTRACT

Systems, devices, and techniques are disclosed for endpoint URL generation and management. An entity identifier may be received. The entity identifier may be hashed with a hashing algorithm to generate an alphanumeric string. A custom endpoint URL may be generated by combining the alphanumeric string with a URL that identifies an endpoint located on a server of a cloud computing system. A CNAME record in a DNS database may be updated to associate the URL that identifies the endpoint located in a stack of cloud computing system with the custom endpoint URL.

12 Claims, 10 Drawing Sheets

(56) References Cited

U.S. PATENT DOCUMENTS

| | | | |
|---|---|---|---|
| 2014/0095871 A1* | 4/2014 | Hoard | H04L 63/0428 |
| | | | 713/168 |
| 2017/0286558 A1* | 10/2017 | Kelleher | H04L 67/02 |
| 2018/0027085 A1* | 1/2018 | Stanislaw | H04L 67/22 |
| | | | 709/224 |
| 2019/0116153 A1* | 4/2019 | Deverakonda | H04L 67/02 |
| 2020/0019725 A1* | 1/2020 | Rule | G06F 21/6245 |
| 2020/0073764 A1* | 3/2020 | Neichev | G06F 11/1482 |

* cited by examiner

ENDPOINT URL GENERATION AND MANAGEMENT

BACKGROUND

Customers of a cloud computing server system may use endpoint URLs that point to endpoints in stacks of the cloud computing server system in their applications and web pages. The operator of a cloud computing server system may move a customer's endpoints to a different stack of the cloud computing server system, resulting in changes to the endpoint URLs used by the customer. This may require the customer to update the endpoint URLs used by their applications and web pages in order for them to remain functional.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
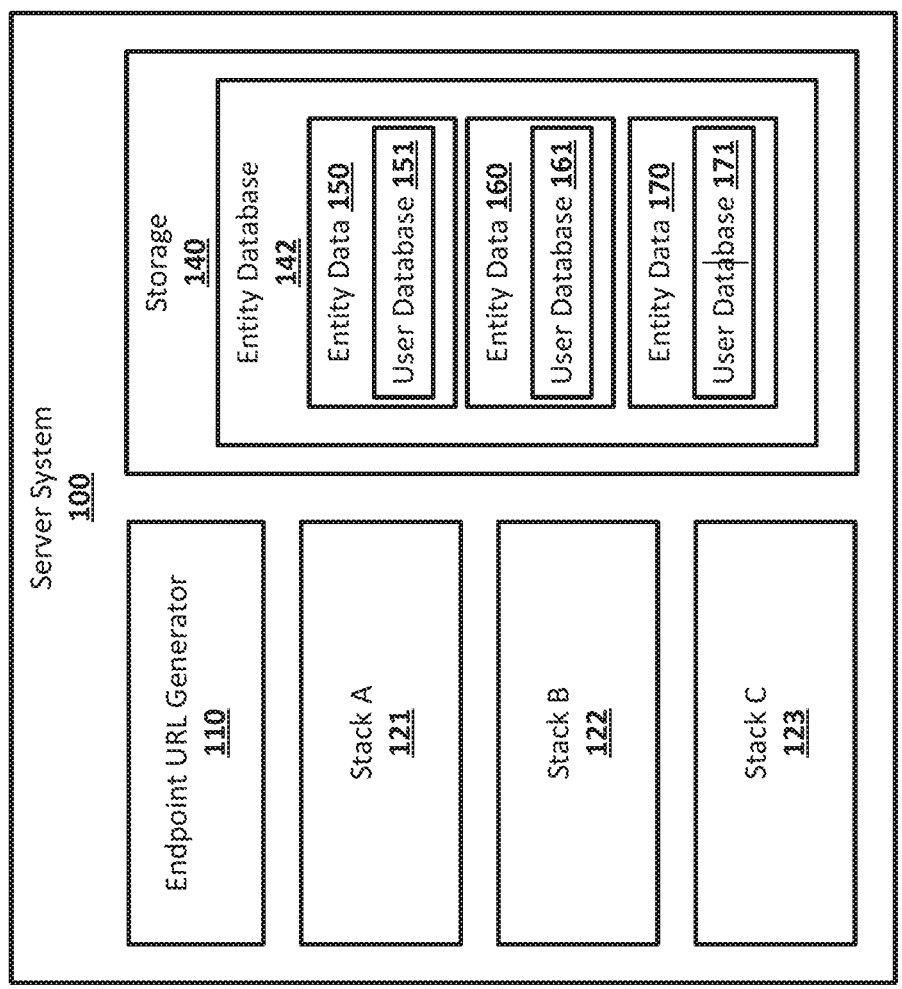
FIG. 1 shows an example system for endpoint URL generation and management according to an implementation of the disclosed subject matter.

Techniques disclosed herein enable endpoint URL (Uniform Resource Locator) generation and management. An entity that has resources hosted at endpoints in a stack of a cloud computing server system may be identified by a unique entity identifier. The entity identifier may be hashed using a cryptographic hashing algorithm to generate an alphanumeric string that may include more characters than the entity identifier. The alphanumeric string may be used generate a URL that may resemble an endpoint URL for an endpoint in a stack of the cloud computing server system, resulting in a custom endpoint URL for that endpoint. Canonical Name (CNAME) records for the endpoint URLs for endpoints used by the entity may be updated in a Domain Name System (DNS) database to associate the endpoint URLs with their corresponding custom endpoint URLs. The entity may use the custom endpoint URLs in applications, web pages, or other software used to access the entity's resources at endpoints in the stack of the cloud computing server system. When the entity's endpoints are moved to a new stack of the cloud computing server system, the endpoint URLs for the endpoints may be updated in the CNAME records that associate the entity's custom endpoint URLs with the entity's endpoint URLs so that the endpoint URL's in the CNAME records point to the endpoints in the stack of the cloud computing server system to which the endpoints were moved. The entity may continue to use the custom endpoint URLs in its applications, web pages, and other software, regardless of which stack of the cloud computing sever system the entity's actual endpoints are located on or how often they are moved to different stacks. The use of the cryptographic hashing algorithm may allow for efficient generation of custom endpoint URLs for any number of entities that may have resources hosted at any number of endpoints on the cloud computing sever system.

A cloud computing server system may include any number of real and virtual computing devices with any suitable computing resources, including hardware resources such as processors and storage devices, software resources, and networking resources, at any number of geographic locations. The cloud computing server system may be segmented into multiple stacks, each of which may have its own portion of the computing resources of the cloud computing server system. Each stack may have its own subdomain that may be used in URLs for accessing resources, such as endpoints, located in the stacks.

Any number of entities may use a cloud computing server system. The entities may be, for example, individuals, groups, businesses, and organizations, which may be customers of an operator of the cloud computing server system. The entities may host and access data and software on the cloud computing server system through services offered by the cloud computing server system. Each service offered by the cloud computing server system to an entity may be available at an endpoint located in the stack of the cloud computing server system to which the entity is assigned and may be accessible using an endpoint URL. Each entity may have a different endpoint URL for accessing the same service on the same stack, as each entity may be given its own endpoints for the services offered by the cloud computing server system.

An entity that uses the cloud computing server system may be identified by a unique entity identifier. An entity identifier may be a string of any suitable length using any suitable characters. For example, entity identifiers may be numbers that include 5 or 6 digits.

The entity identifier for an entity may be input to a cryptographic hashing algorithm to generate an alphanumeric string. For example, the cloud computing server system may host a URL generation service that generates custom endpoint URLs and that may be accessible to entities that use the cloud computing server system. An entity that wishes to have a custom endpoint URL generated for a specific endpoint may access the URL generation service and request the generation of a custom endpoint URL for specified endpoints used by the entity. The URL generation service may then input that entity's entity identifier into a cryptographic hashing algorithm. The same cryptographic hashing algorithm may be used regardless of the entity that is requesting the custom endpoint URL. In some implementations, all entity identifiers for all entities that use the cloud computing server system may be input to the cryptographic hashing algorithm without requiring that the entity access the URL generation service so that custom endpoint URLs may be generated for all endpoints for all entities that use the cloud computing server system.

The cryptographic hashing algorithm may be chosen, and configured, to output an alphanumeric string that conforms DNS standards. For example, the cryptographic hashing algorithm may be chosen or configured to avoid output that includes character strings that resemble profanity in any language. The cryptographic hashing algorithm may, for example, output a 26-character alphanumeric string from any input.

The alphanumeric string output by the cryptographic hashing algorithm based on the input of the entity identifier may be used to create a custom endpoint URL. For example, if the URL generation service was accessed by the entity to request a custom endpoint URL for a specified endpoint, the alphanumeric string may be added to the endpoint URL for the specified endpoint. The alphanumeric string may, for example, be prepended to the endpoint URL as a first subdomain name or may be used to replace subdomain names in the endpoint URL to generate the custom endpoint URL. Additional characters may be prepended to the alphanumeric string to ensure that the custom endpoint URL conforms to DNS standards. For example, two alphabetical characters may be prepended to the alphanumeric string to ensure that the custom endpoint URL does not begin with a number, hyphen, or other non-alphabetical character.

The custom endpoint URL generated by the URL generation service may be added to a CNAME record in a DNS database. For example, a CNAME record may be created or updated to associate the custom endpoint URL with the endpoint URL for the endpoint for which the custom endpoint URL was generated. The CNAME record may be stored in any suitable DNS database. For example, the CNAME record may be stored in any number and combination of public and private DNS databases, including, for example, private DNS databases hosted and maintained by the cloud computing server system. The CNAME record may cause requests to access the custom endpoint URL to be translated as a request to access the endpoint URL for the endpoint for which the custom endpoint URL was generated, which DNS may then resolve to the IP address for the endpoint for which the custom endpoint URL was generated.

When an endpoint for which a custom endpoint URL was generated is moved to a different stack of the cloud computing server system, the CNAME record that associates the custom endpoint URL with the endpoint URL for the endpoint for which the custom endpoint URL was generated may be updated. Moving an entity's endpoint to a different stack in a cloud computing server system may result in the endpoint URL used to access the endpoint changing. The new endpoint URL for the endpoint may, for example, include different subdomains that identify the new stack to which the endpoint was moved. The CNAME record that associates the custom endpoint URL with the endpoint URL for the endpoint for which the custom endpoint URL was generated may be updated with the new endpoint URL. This may result in the CNAME record associating the custom endpoint URL with the new endpoint URL, so that requests to access the custom endpoint URL may be translated as request to access the new endpoint URL. Applications, web pages, and other software that use the custom endpoint URL may not need to be changed even though the endpoint has moved and is accessible using a new endpoint URL as the update to the CNAME record may allow the custom endpoint URL to be translated to the new endpoint URL. The custom endpoint URL may thus still be used to access the endpoint in the endpoint's new stack, even if the custom endpoint URL was generated while the endpoint was still in its previous stack.

The URL generation service and cryptographic hashing algorithm may allow entities that use the cloud computing server system to have custom endpoint URLs generated on-demand while still producing URLs that are unique to each entity and service. As the cloud computing sever system adds new endpoints to provide additional services, additional custom endpoint URLs may be efficiently generated for entity's that wish to use the new endpoints. The custom endpoint URLs may allow entities to not have to make changes to their applications, web pages, or other software that accesses endpoints of the cloud computing server system when the endpoints are moved to different stacks of the cloud computing server system.

Custom endpoint URLs may be used to verify requests to access endpoints submitted to the cloud computing server system. To access an endpoint on the cloud computing server system from another computing device, a user identifier, or username, and password or other form of authentication may need to be submitted to the cloud computing server system along with the custom endpoint URL for the endpoint. When a request to access an endpoint on the cloud computing server system is received, the submitted user identifier may be checked to determine which entity the user identifier belongs to out of the various entities that use the cloud computing server system. For example, a user identifier may include an indication of the entity to which it belongs, and/or the cloud computing server system may maintain a database of usernames and the entities to which they belong. For example, the cloud computing server system may be used by several different business organizations, each of which may have its own endpoints and its own user base separate from the user bases of the other business organizations.

The cloud computing sever system may compare the entity to which the user identifier belongs with an entity determined from the custom endpoint URL that the user identifier is being used to access. The cloud computing server system may, for example, maintain a database which associates the alphanumeric strings used in custom endpoint URLs with the entities to which the alphanumeric strings used in custom endpoint URLs belong. If the user identifier and the alphanumeric string of the custom endpoint URL the user identifier is being used to access belong to the same entity, the cloud computing server system may allow access to the endpoint if the password or other authentication submitted with the user identifier is correct. If they do not belong to the same entity, the cloud computing server system may prevent access to the endpoint, denying the request, even if the password or submitted authentication is correct for the user identifier.

The cloud computing sever system may also use the entity identifier for the entity to which the user identifier belongs as input to the cryptographic hashing algorithm, for example, if the cloud computing server does not maintain or has lost access to the database associating alphanumeric strings from custom endpoint URLs with entities. If the alphanumeric string output by the cryptographic hashing algorithm matches the alphanumeric string in the custom endpoint URL that the user identifier is being used to access, the cloud computing server system may allow access to the endpoint if the password or other authentication submitted with the user identifier is correct. If they do not match, the cloud computing server system may prevent access to the endpoint, denying the request, even if the password or other submitted authentication is correct for the user identifier. The alphanumeric string output by the cryptographic hashing algorithm may be subjected to the same changes, such as the prepending of characters, that are used when generating a custom endpoint URL to ensure proper matching with the alphanumeric string from the custom endpoint URL that the user identifier is being used to access. Alternatively, any such changes may be removed from the alphanumeric string from the custom endpoint URL that the user identifier is being used to access.

In some implementations, alphanumeric strings generated and modified to be used in custom endpoint URLs may be stored in an endpoint string database along with the entity identifier used as input to generate the alphanumeric string. The endpoint string database may associate an alphanumeric string, or endpoint string, with the entity identifiers used to generate it. This may allow for the generation of multiple custom endpoint URLs for an entity without requiring repeated use of the cryptographic hashing algorithm. After an alphanumeric string has been generated once from an entity identifier for an entity using the cryptographic hashing algorithm to generate a custom endpoint URL, all subsequent custom endpoint URLs for that entity may be generated by reading the alphanumeric string from the endpoint string database instead of inputting the entity identifier into the cryptographic hashing algorithm again.

In some implementations, modifications made to an alphanumeric string generated using the cryptographic hashing algorithm may include versioning information. For example, the cryptographic hashing algorithm may be changed or modified. To indicate what version of the cryptographic hashing algorithm was used to generate an alphanumeric string, alphabetical characters may be prepended to the alphanumeric string. For example, "ma" may be prepended to alphanumeric strings generated by a first version of the cryptographic hashing algorithm. The cryptographic hashing algorithm may be changed to a second version and "mb" may be prepended to the alphanumeric strings output by the second version. The version information in an alphanumeric string may be used, for example, when determining which version of the cryptographic hashing algorithm to input an entity identifier to when verifying a request to access an endpoint that has been submitted to the cloud computing server system FIG. 1 shows an example system for endpoint URL generation and management according to an implementation of the disclosed subject matter. A server system 100 may include any suitable computing devices, such as, for example, a computer 20 as described in FIG. 9 or component thereof. The server system 100 may be implemented on a laptop, a desktop, an individual server, a server cluster, a server farm, or a distributed server system, or can be implemented as a virtual computing device or system, or any suitable combination of physical and virtual systems. The server system 100 can be part of a computing system and network infrastructure or can be otherwise connected to the computing system and network infrastructure, including a larger server network which can include other server systems. The server system 100 may include, for example, any number of server systems which may be in communication with each other and may communicate in any suitable manner. For example, the server systems of the server system 100 may be connected through any suitable network, which may be any suitable combination of LANs and WANs, including any combination of private networks and the Internet. The server system 100 may be a cloud computing server system for a cloud computing service. The server system 100 may include a Endpoint URL generator 110, stack A 121, stack B 122, stack C 123, and a storage 140. The storage 140 may include an entity database 142.

The Endpoint URL generator 110 may be any suitable combination of hardware and software of the server system 100 for generating custom endpoint URLs for endpoints used by entities that use the server system 100. The Endpoint URL generator 110 may be part of a URL generation service made available by the server system 100 to entities that use the server system 100. The Endpoint URL generator 110 may, for example, include a cryptographic hashing algorithm. An entity that wishes to have a custom endpoint URL generated for a specific endpoint may access the Endpoint URL generator 110 and request the generation of a custom endpoint URL for specified endpoints used by the entity. For example, the entity may access the Endpoint URL generator 110 on the server system 100 through a web-based interface using HTTP, or through an application, for example, using API calls. The Endpoint URL generator 110 may then input that entity's entity identifier into a cryptographic hashing algorithm. The same cryptographic hashing algorithm may be used regardless of the entity that is requesting the custom endpoint URL. In some implementations, all entity identifiers for all entities that use the server system 100 may be input to the cryptographic hashing algorithm without requiring that the entity access the Endpoint URL generator 100 service so that custom endpoint URLs may be generated for all endpoints for all entities that use the server system 100.

The cryptographic hashing algorithm may be chosen, and configured, to output an alphanumeric string that conforms DNS standards. For example, the cryptographic hashing algorithm may be chosen or configured to avoid output that includes character strings that resemble profanity in any language. The alphanumeric string output by the cryptographic hashing algorithm may be of any suitable length and may always be of the same length for any input, or may be of different lengths for different inputs. For example, the cryptographic hashing algorithm may output a 26-character alphanumeric string from any input.

The Endpoint URL generator 100 may use the alphanumeric string output by the cryptographic hashing algorithm based on the input of the entity identifier to create a custom endpoint URL. For example, if the Endpoint URL generator 100 was accessed by the entity to request a custom endpoint URL for a specified endpoint, the alphanumeric string may be added to the endpoint URL for the specified endpoint. The alphanumeric string may, for example, be prepended to the endpoint URL as a first subdomain name or may be used to replace subdomain names in the endpoint URL to generate the custom endpoint URL. The Endpoint URL generator 100 may prepend additional characters to the alphanumeric string to ensure that the custom endpoint URL conforms to DNS standards. For example, the Endpoint URL generator 100 may prepend two alphabetical characters to the alphanumeric string to ensure that the custom endpoint URL does not begin with a number, hyphen, or other non-alphabetical character.

The Endpoint URL generator 100 may add a generated custom endpoint URL to a CNAME record in a DNS database. For example, a CNAME record may be created or updated to associate the custom endpoint URL with the endpoint URL for the endpoint for which the custom endpoint URL was generated. The CNAME record may be stored in any suitable DNS database. For example, the CNAME record may be stored in any number and combination of public and private DNS databases, including, for example, private DNS databases hosted and maintained by the cloud computing server system. The CNAME record may cause requests to access the custom endpoint URL to be translated to requests to access the endpoint URL for the endpoint for which the custom endpoint URL was generated.

The stack A 121, stack B 122, and stack C 123 may be any suitable combination of hardware and software of the server system 100 for allowing entities that use the server system 100 to access computational resources of the server system 100. For example, each of the stack A 121, stack B 122, and stack C 123 may be a separate collection of computational resources of the server system 100, including hardware such as processors and storage, networking resources such as bandwidth and network connections, and software resources such as, for example, virtualization software and software implementing services that may be used by an entity, and databases. The hardware of the server system 100 used by the stack A 121, stack B 122, and stack C 123 may be distributed across any number of computing devices and physical and geographic locations.

Endpoints for services made available by the server system 100 may be located in the stack A 121, stack B 122, and stack C 123. The endpoints used by a specific entity may be assigned to one of the stack A 121, stack B 122, and stack C 123. For example, a first entity may have its endpoints located in stack A 121, while a second entity may have its endpoints located in stack B 122. URLs used to access endpoints in the stacks may use a subdomain to identify the appropriate stack. For example, an endpoint located in stack A 121 may be accessed with a URL of the form endpoint-type.stackA.serversystem.com. The endpoints may offer services and data that may be accessed, for example, through API requests.

The storage 140 may be any suitable combination of hardware and software for the storage of data on the server system 100. For example, the storage 140 may include hard drives, solid state drives, random access memory, or other forms of data storage which may be persistent or non-persistent. The storage 140 may store an entity database 142. The entity database 142 may store data about the entities, for example, individuals, groups, organizations, and businesses, that use the server system 100, for example, as customers of a cloud computing service that operates the server system 100. The entity database 142 may, for example, store entity data 150, entity data 160 and entity 170, which may be the separate entity data for three separate entities that use the server system 100. The entity data 150 may include a user database 151, which may be a database of user identifiers, or usernames, and associated passwords for users associated with the entity whose data is stored as the entity data 150. The entity data 160 may include a user database 161, which may be a database of user identifiers, or usernames, and associated passwords for users associated with the entity whose data is stored as the entity data 160. The entity data 170 may include a user database 171, which may be a database of user identifiers, or usernames, and associated passwords for users associated with the entity whose data is stored as the entity data 170.

Figure 2:
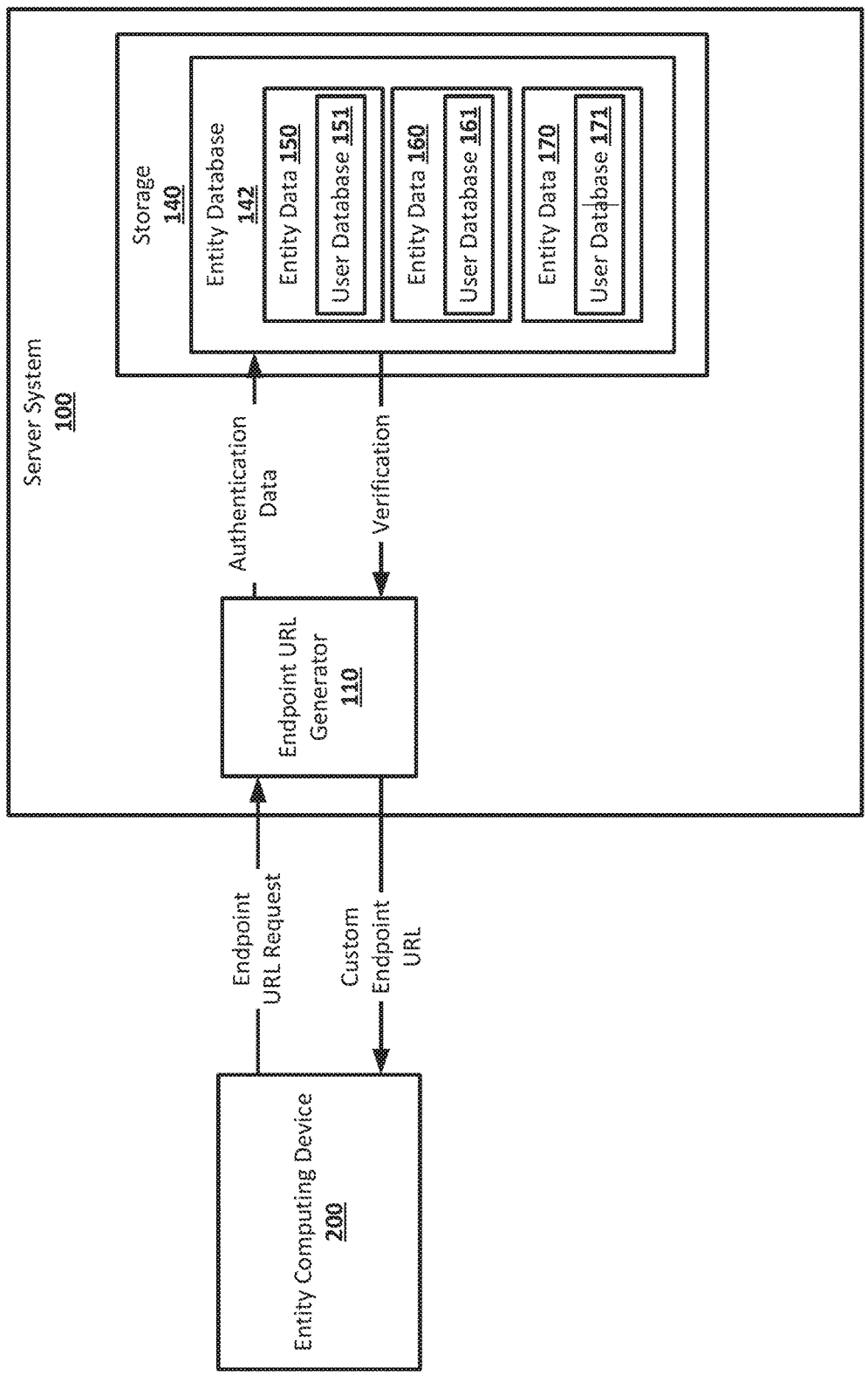
FIG. 2 shows an example arrangement for endpoint URL generation and management according to an implementation of the disclosed subject matter.

FIG. 2 shows an example arrangement for endpoint URL generation and management according to an implementation of the disclosed subject matter. An entity computing device 200 may be any suitable computing device, such as, for example, a computer 20 as described in FIG. 9 or component thereof. The entity computing device 200 may be implemented on a laptop, a desktop, an individual server, a server cluster, a server farm, or a distributed server system, or can be implemented as a virtual computing device or system, or any suitable combination of physical and virtual systems. The entity computing device 200 can be part of a computing system and network infrastructure or can be otherwise connected to the computing system and network infrastructure, including a larger server network which can include other server systems. The entity computing device 200 may include, for example, any number of server systems which may be in communication with each other and may communicate in any suitable manner. For example, the server systems of the entity computing device 200 may be connected through any suitable network, which may be any suitable combination of LANs and WANs, including any combination of private networks and the Internet. The entity computing device 200 may be a computing device used by an entity that also uses the server system 100. For example, the entity computing device 200 may be a local computing device used by a business that is a customer of a cloud computing service that operates the server system 100.

The entity computing device 200 may submit an endpoint URL request to the Endpoint URL generator 110 of the server system 100. The endpoint URL request may identify the endpoint for which a custom endpoint URL is being requested in any suitable manner. For example, the endpoint may be identified by its current endpoint URL, or by the service type provided by the endpoint and the entity that is submitting the request. The endpoint URL request may also include, for example, a user identifier and password to ensure that the request is being submitted by an entity uses the server system 100, for example, has entity data stored in the entity database 142. The endpoint URL request may also include, for example, the entity identifier for the entity submitting the request. The entity identifier may also be determined by the server system 100, for example, by determining which of the user database 151, 161, and 171 includes the user identifier submitted with the endpoint URL request, and thereby which entity the user identifier is associated with. The user identifier may also include an indication of the entity with which the user identifier is associated, for example, as a subdomain or domain name that is part of the user identifier.

The Endpoint URL generator 110 may use any appropriate authentication data in the endpoint URL request to verify the request. For example, a user identifier and password in the endpoint URL request may be used to verify that the endpoint for which a custom endpoint URL is being requested belongs to the entity that submitted the request using the entity computing device 200.

Once the endpoint URL request has been verified, the Endpoint URL generator 110 may generate a custom endpoint URL for the endpoint identified in the endpoint URL request. The Endpoint URL generator may use the entity identifier for the entity that submitted the endpoint URL request as input to the cryptographic hashing algorithm. The cryptographic hashing algorithm may output an alphanumeric string. The alphanumeric string may be used to create the custom endpoint URL in any suitable manner. For example, the alphanumeric string may be prepended to the endpoint URL for the endpoint identified in the endpoint URL request or may be used to replace subdomains of the endpoint URL for the endpoint identified in the endpoint URL request. The Endpoint URL generator 100 may make additional changes to the alphanumeric string after it is generated, for example, prepending alphabetical characters to the alphanumeric string to ensure that the alphanumeric string does not begin with a hyphen or a number.

For example, the entity identifier of the entity that submitted the endpoint URL request to the Endpoint URL generator 100 may be 219342. The string "219342" may be input to the cryptographic hashing algorithm, which may output the alphanumeric string "b2ba6f44c0483d773-e2fc14e55a85907". The alphabetical string "mc" may be prepended to the alphanumeric string. The endpoint identified in the endpoint URL request may be located in stack A 121 of the server system 100 and have an endpoint URL of "entityA.serviceB.stackA.serversystem.com". The Endpoint URL generator 100 may generate a custom endpoint URL of "mcb2ba6f44c0483d773e2fc14e55a85907.entityA.serviceB.serversystem.com".

After the custom endpoint URL has been generated, the custom endpoint URL may be returned to the entity computing device 200 from which the endpoint URL request was received. This may allow the entity to being using the custom endpoint URL, for example, adding the custom endpoint URL to its applications, web pages, and other software, and editing already extant API calls that use the endpoint URL for which the custom endpoint URL was generated to use the custom endpoint URL.

Figure 3:
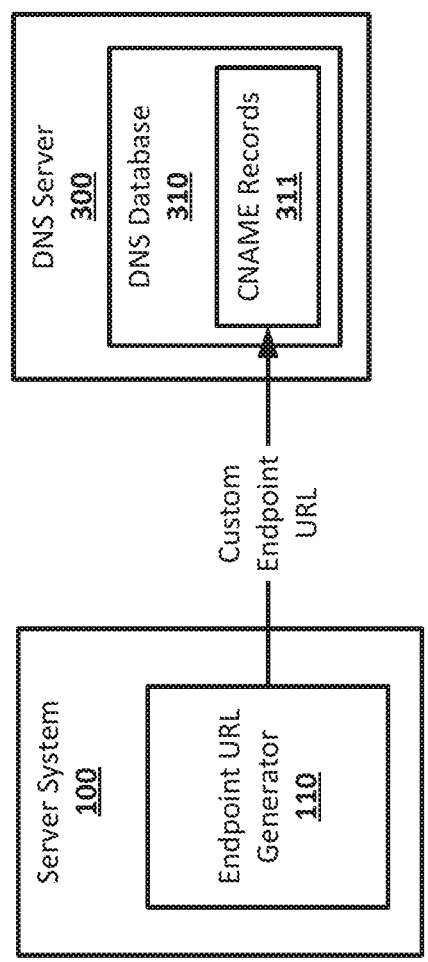
FIG. 3 shows an example arrangement for endpoint URL generation and management according to an implementation of the disclosed subject matter.

FIG. 3 shows an example arrangement for endpoint URL generation and management according to an implementation of the disclosed subject matter. After generating a custom endpoint URL, the Endpoint URL generator 110 may update a CNAME record for the endpoint for which the custom endpoint URL was generated. A DNS server 300 may be any suitable DNS server, and may be a public DNS server or may be a private DNS server that may be part of, or operated along with, the server system 100. The DNS server 300 may store a DNS database 310, which may include DNS records including CNAME records 311. If a CNAME record already exists in the CNAME records 311 for the endpoint for which the custom endpoint URL was generated, the Endpoint URL generator 110 may update the CNAME record by adding the custom endpoint URL to the CNAME record, which may already include the endpoint URL for the endpoint. This may result in DNS requests for the custom endpoint URL being translated to the endpoint URL for endpoint for which the custom endpoint URL was generated. If no CNAME record exists in the CNAME records 311 for the endpoint for which the custom endpoint URL was generated, the Endpoint URL generator 110 may create a new CNAME record so that DNS requests for the custom endpoint URL are translated to the endpoint URL for endpoint for which the custom endpoint URL was generated.

For example, the Endpoint URL generator 110 may update a CNAME record for an endpoint that provides "service B" and is located in stack A 121 with a custom endpoint URL. The endpoint may have an endpoint URL of "entityA.serviceB.stackA.serversystem.com", which may be resolvable to the IP address and port where "service B" can be accessed, for example, through submitted API requests. The CNAME record may be updated by adding the custom endpoint URL "mcb2ba6f44c0483d773e2fc14-e55a85907.entityA.serviceBserversystem.com" to the CNAME record. This may result in DNS requests submitted to the DNS server 300 for "mcb2ba6f44c0483d77-3e2fc14e55a85907.entityA.serviceB.serversystem.com" being translated to "entityA.serviceB.stackA.serversystem.com", and then resolved to the IP address for "entityA.serviceB.stackA.serversystem.com", allowing access to the endpoint located in stack A 121 of the server system 100 through the use of the URL "mcb2ba6f44c0483d773e2f-c14e55a85907.entityA.serviceB.serversystem.com".

Figure 4:
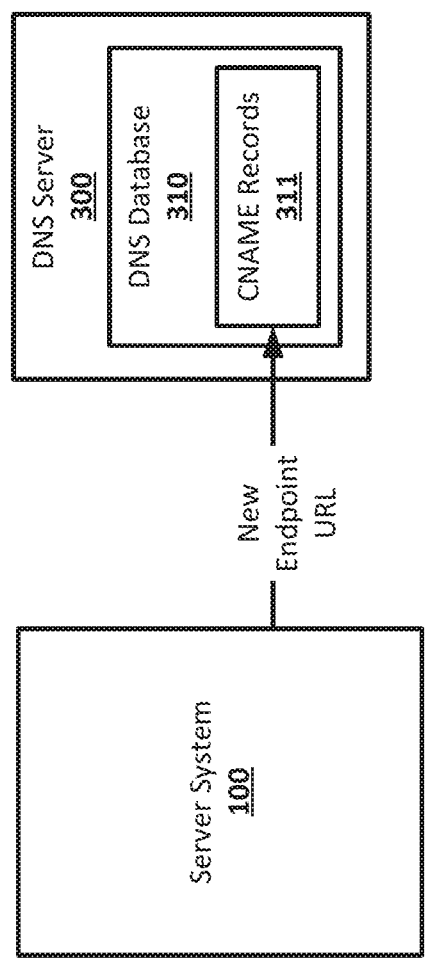
FIG. 4 shows an example arrangement for endpoint URL generation and management according to an implementation of the disclosed subject matter.

FIG. 4 shows an example arrangement for endpoint URL generation and management according to an implementation of the disclosed subject matter. An endpoint which has previously had a custom endpoint URL generated for it may be moved to a different stack of the server system 100. For example, the endpoint that had been accessible at the URL "entityA.serviceB.stackA.serversystem.com" may be moved from the stack A 121 to the stack B 121. This may necessitate that the endpoint's URL be changed to "entityA.serviceB.stackB.serversystem.com". Attempts to access the endpoint at its previous URL, "entityA.serviceB.stackA.serversystem.com", may fail.

The server system 100 may update the CNAME record of the CNAME records 311 on the DNS server 300 for the endpoint that has been moved to a new stack, replacing the endpoint URL in the CNAME record with a new endpoint URL that points to the endpoint's new stack. This may allow the previously generated custom endpoint URL that is in the CNAME record to still be used to access the endpoint, as the custom generated endpoint URL will translate to the endpoint's new URL after the CNAME record is updated. For example, the CNAME record that causes a DNS request for the custom endpoint URL "mcb2ba6f44c0483d773-e2fc14e55a85907.entityA.serviceB.serversystem.com" to translate to "entityA.serviceB.stackA.serversystem.com" may be updated to replace "entityA.serviceB.stackA.serversystem.com" with "entityA.serviceB.stackB.serversystem.com". This may allow for "mcb2ba6f44c0483d773e-2fc14e55a85907.entityA.serviceBserversystem.com" to continue to be used to access the endpoint that was originally in stack A 121 and had an endpoint URL of "entityA.serviceB.stackA.serversystem.com" and was moved to stack B 122 and given a new endpoint URL of "entityA.serviceB-.stackB.serversystem.com". Once a custom endpoint URL has been generated for an endpoint, that custom endpoint URL may always be used to access the endpoint no matter how many times the endpoint is moved to a different stack so long as the CNAME record for the endpoint is updated in the DNS database 310 of the DNS server 300 with the new endpoint URL for the endpoint.

Figure 5A:
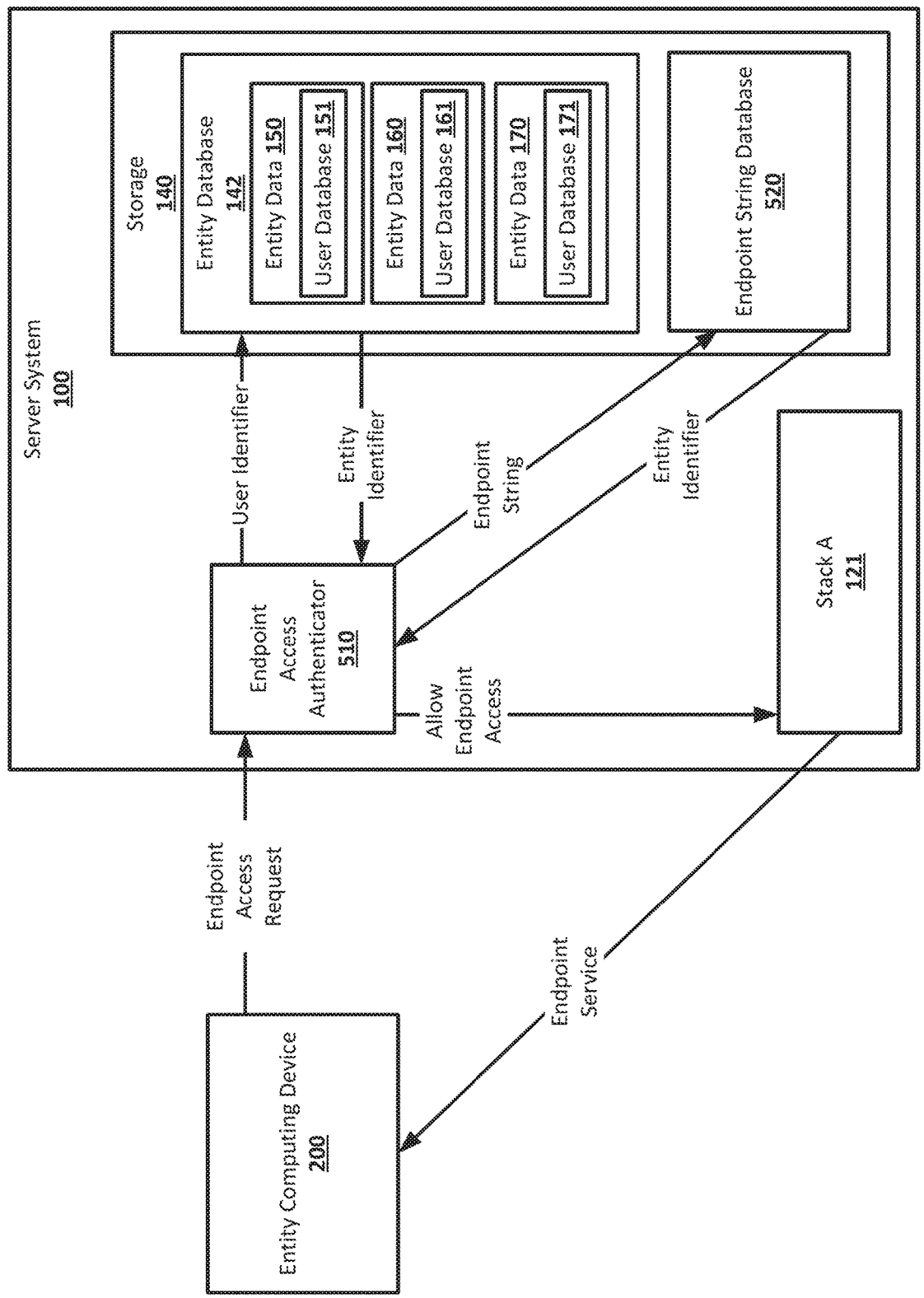
FIG. 5A shows an example arrangement for endpoint URL generation and management according to an implementation of the disclosed subject matter.

FIG. 5A shows an example arrangement for endpoint URL generation and management according to an implementation of the disclosed subject matter. The entity computing device 200 may be used to request access to an endpoint on the server system 100, for example, in the stack A 121. The entity computing device 200 may submit an endpoint access request, which may include, for example, a user identifier, or username, and password along with the custom endpoint URL for the endpoint for which access is being requested. The endpoint access request, using the custom endpoint URL, may be resolved to an IP address through the DNS server 300 translating the custom endpoint URL to an endpoint URL and resolving the IP address of the endpoint URL. The endpoint access request may be received at an endpoint access authenticator 510 of the server system 100.

The endpoint access authenticator 510 may be any suitable hardware and software on the server system 100 for determining whether to grant a request from another computing device to access an endpoint on the server system 100. The endpoint access authenticator 510 may be part of a stack of the sever system 100, with each stack having its own endpoint access authenticator, or any number of endpoint access authenticators may be shared among the stacks of the server system 100.

The endpoint access authenticator 510 may look up the user identifier received in the endpoint access request in the user databases 151, 161, and 171 of the entity database 142 to determine which entity the user identifier belongs to. The endpoint access authenticator 510 may, for example, receive the entity identifier of the entity to which the user identifier belongs from the entity database 142. The endpoint access authenticator 510 may also look up an endpoint string in an endpoint string database 520. The endpoint string may be the alphanumeric string in the custom endpoint URL received in the endpoint access request. The endpoint string database 520 may be a database in the storage 140 of the server system 100 which associates custom endpoint URLs with the entities that they belong to. The endpoint access authenticator 510 may, for example, retrieve the entity identifier of the entity to which the custom endpoint URL belongs from the endpoint string database 520. The endpoint access authenticator 510 may compare the entity identifier retrieved from the entity database 142 with the entity identifier retrieved from the endpoint string database 520. If the entity identifiers match, the endpoint access authenticator 510 may allow access to the endpoint if the password submitted with the user identifier is the correct password for the user identifier, as the endpoint may belong to the entity that requested access from the entity computing device 200. For example, the endpoint access authenticator 510 may indicate to the stack A 121 to establish a connection with the entity computing device 200 so that the entity computing device 200 may access the service available at the endpoint for which access was requested, such as, for example, an application running on the stack A 121 or a database available through the stack A 121. If the endpoint access authenticator 510 determines that the entity identifiers do not match, the endpoint access authenticator 510 may deny the endpoint access request and prevent the entity computing device 200 from accessing the endpoint located in the stack A 121, as the endpoint may not belong to the entity that submitted the request from the entity computing device 200.

Figure 5B:
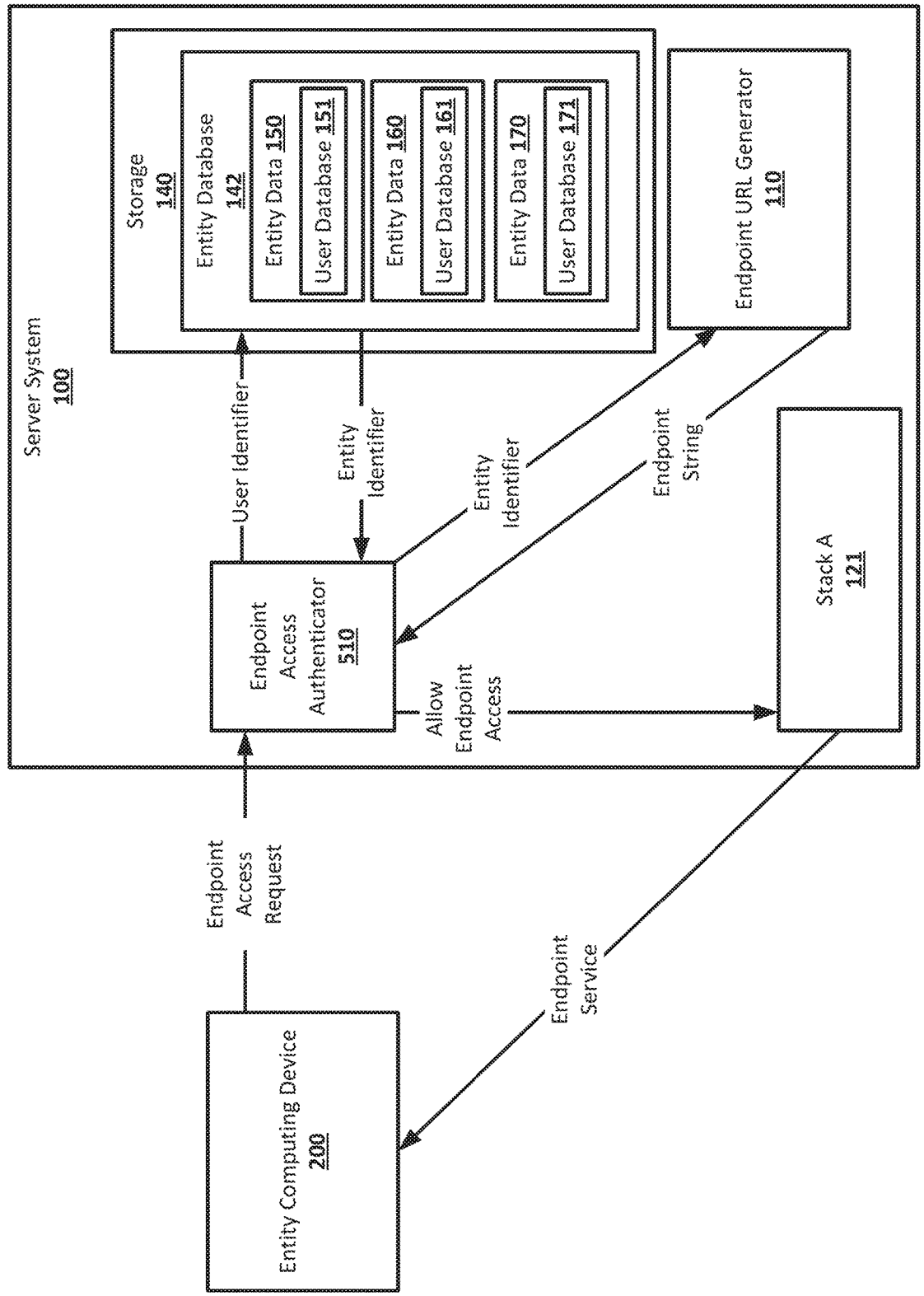
FIG. 5B shows an example arrangement for endpoint URL generation and management according to an implementation of the disclosed subject matter.

FIG. 5B shows an example arrangement for endpoint URL generation and management according to an implementation of the disclosed subject matter. If the endpoint string database 520 is not available, for example, was never created, has been taken offline deliberately, or is subject to network connectivity issues, the endpoint access authenticator 510 may instead use the Endpoint URL generator 110 to authenticate an endpoint access request. The endpoint access authenticator 510 may look up the user identifier received in the endpoint access request in the user databases 151, 161, and 171 of the entity database 142 to determine which entity the user identifier belongs to. The endpoint access authenticator 510 may, for example, retrieve the entity identifier of the entity to which the user identifier belongs from the entity database 142. The endpoint access authenticator may then use the entity identifier retrieved from the entity database 142 as input to the Endpoint URL generator 110. The Endpoint URL generator 110 may input the entity identifier to the cryptographic hashing algorithm to generate an alphanumeric string, which may then be modified as it would be if it were being used to create a custom endpoint URL. The alphanumeric string may then be returned, as an endpoint string, to the endpoint access authenticator 510. The endpoint access authenticator 510 may compare the endpoint string received from the Endpoint URL generator 110 with the endpoint string from the custom endpoint URL in the endpoint access request. If the endpoint strings match, the endpoint access authenticator 510 may allow access to the endpoint if the password submitted with the user identifier is the correct password for the user identifier, as the endpoint may belong to the entity that requested access from the entity computing device 200. For example, the endpoint access authenticator 510 may indicate to the stack A 121 to establish a connection with the entity computing device 200 so that the entity computing device 200 may access the service available at the endpoint for which access was requested, such as, for example, an application running on the stack A 121 or a database available through the stack A 121. If the endpoint access authenticator 510 determines that the endpoint strings do not match, the endpoint access authenticator 510 may deny the endpoint access request and prevent the entity computing device 200 from accessing the endpoint located in the stack A 121, as the endpoint may not belong to the entity that submitted the request from the entity computing device 200.

Figure 6:
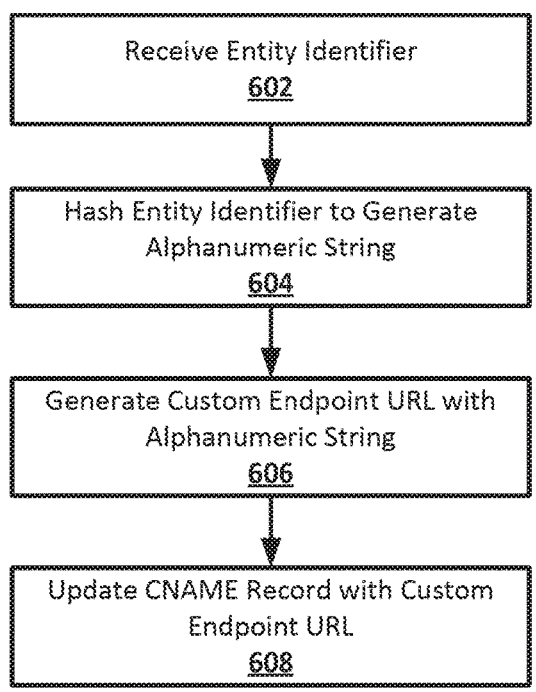
FIG. 6 shows an example procedure suitable for endpoint URL generation and management according to an implementation of the disclosed subject matter.

FIG. 6 shows an example procedure suitable for endpoint URL generation and management according to an implementation of the disclosed subject matter. At 602, an entity identifier may be received. For example, an endpoint URL request may be received at the Endpoint URL generator 110. The Endpoint URL generator 110 may use a user identifier provided in the endpoint URL request to determine an entity to which the user identifier belongs and may receive the entity identifier for that entity from the entity database 142.

At 604, the entity identifier may be hashed to generate an alphanumeric string. For example, the entity identifier received from the entity database 142 may be input to a cryptographic hashing algorithm by the Endpoint URL generator 110. The cryptographic hashing algorithm may output an alphanumeric string that may be of any suitable length.

At 606, a custom endpoint URL may be generated with the alphanumeric string. For example, the Endpoint URL generator 110 may prepend the alphanumeric string output by the cryptographic hashing algorithm to an endpoint URL for the endpoint identified in the endpoint URL request or may use the alphanumeric string to replace subdomains in the endpoint URL. Alternatively, the custom endpoint URL may be generated entirely new using the alphanumeric string. The alphanumeric string output by the cryptographic hashing algorithm may be modified, for example, having alphabetical characters prepended to it to ensure that the custom endpoint URL conforms to DNS standards.

At 608, a CNAME record may be updated with the custom endpoint URL. For example, a CNAME record for the endpoint for which the custom endpoint URL was generated may include the endpoint URL for the endpoint. The CNAME record may be stored, for example, in the DNS database 310 of the DNS server 300. The CNAME record may be updated with the custom endpoint URL, so that DNS requests for the custom endpoint URL may be translated to the endpoint URL.

Figure 7:
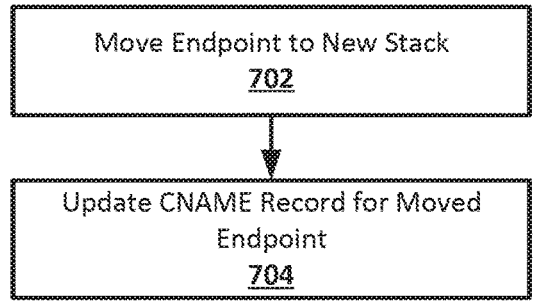
FIG. 7 shows an example procedure suitable for endpoint URL generation and management according to an implementation of the disclosed subject matter.

FIG. 7 shows an example procedure suitable for endpoint URL generation and management according to an implementation of the disclosed subject matter. At 702, an endpoint may be moved to a new stack. For example, an endpoint belonging to an entity may be moved from the stack A 121 to the stack B 122 on the server system 100. The endpoint may be moved, for example, when all of the entities endpoints are migrated from the stack A 121 to the stack B 122 of the server system 100.

At 704, a CNAME record may be updated with the custom endpoint URL. For example, a CNAME record for the endpoint for which was moved may include the endpoint URL for the endpoint and a custom endpoint URL for the endpoint. The CNAME record may be stored, for example, in the DNS database 310 of the DNS server 300. The CNAME record may be updated with the new endpoint URL for the endpoint in the stack that the endpoint was moved to, replacing the endpoint URL for the endpoint in the stack that the endpoint was moved from, so that DNS requests for the custom endpoint URL may be translated to the endpoint URL for the endpoint located in its new stack.

Figure 8A:
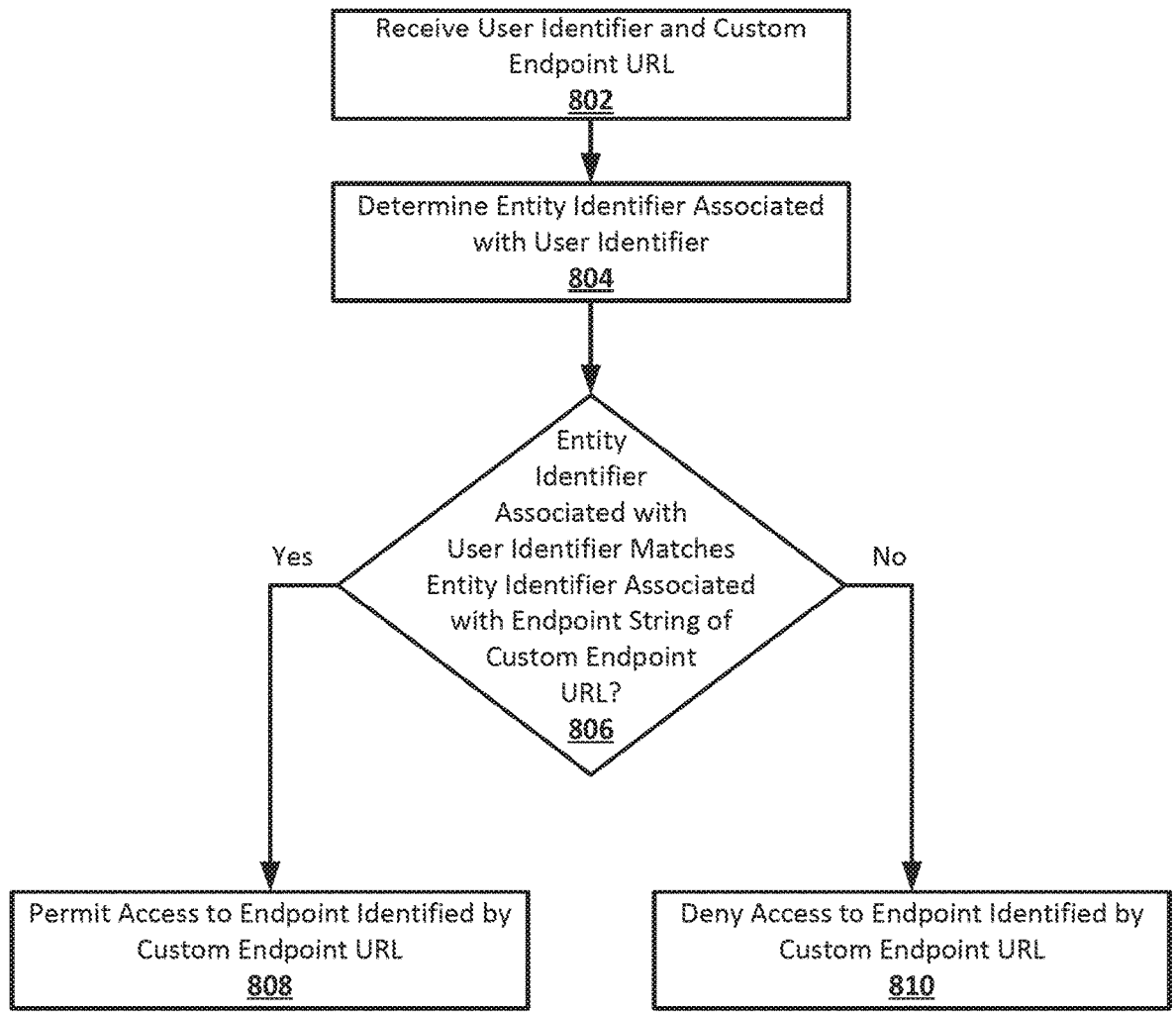
FIG. 8A shows an example procedure suitable for endpoint URL generation and management according to an implementation of the disclosed subject matter.

FIG. 8A shows an example procedure suitable for endpoint URL generation and management according to an implementation of the disclosed subject matter. At 802, a user identifier and custom endpoint URL may be received. For example, the endpoint access authenticator 510 may receive an endpoint access request from the entity computing device 200. The endpoint access request may include a user identifier and a custom endpoint URL for the endpoint to which access is being requested.

At 804, an entity identifier associated with the user identifier may be determined. For example, the endpoint access authenticator 510 may use the user databases 151, 161, and 171 in entity database 142 to determine which entity the user identifier belongs to and the entity identifier for that entity.

At 806, if the entity identifier associated with the user identifier matches an entity identifier associated with the endpoint string of the custom endpoint URL, flow may proceed to 808 where access to the endpoint identified by the custom endpoint URL may be permitted. Otherwise, flow may proceed to 810, where access to the endpoint identified by the custom endpoint URL may be denied. For example, the endpoint access authenticator 510 may determine the entity identifier associated with an endpoint string of the custom endpoint URL using the endpoint string database 520, which may associate endpoint strings, or alphanumeric strings, from the custom endpoint URLs with the entities whose entity identifiers were used to generate the endpoint strings. The entity identifier associated with the user identifier may be compared to the entity identifier associated with the endpoint string of the custom endpoint URL to determine whether they match.

At 808, access to the endpoint identified by the custom endpoint URL may be permitted. For example, the endpoint access authenticator 510 may have determined that the entity identifier associated with the user identifier matches the entity identifier associated with the endpoint string of the custom endpoint URL. This may indicate that the user identifier belongs to the same entity as the endpoint in the endpoint access request. If the proper password or other form of authentication is provided along with the user identifier by the entity computing device 200, the endpoint access authenticator 510 may permit the entity computing device 200 to access the endpoint that is identified by the custom endpoint URL that was sent in the endpoint access request.

At 810, access to the endpoint identified by the custom endpoint URL may be denied. For example, the endpoint access authenticator 510 may have determined that the entity identifier associated with the user identifier does not match the entity identifier associated with the endpoint string of the custom endpoint URL. This may indicate that the user identifier belongs to a different entity than the endpoint in the endpoint access request. The entity computing device 200 may not be permitted to access the endpoint identified by the custom endpoint URL.

Figure 8B:
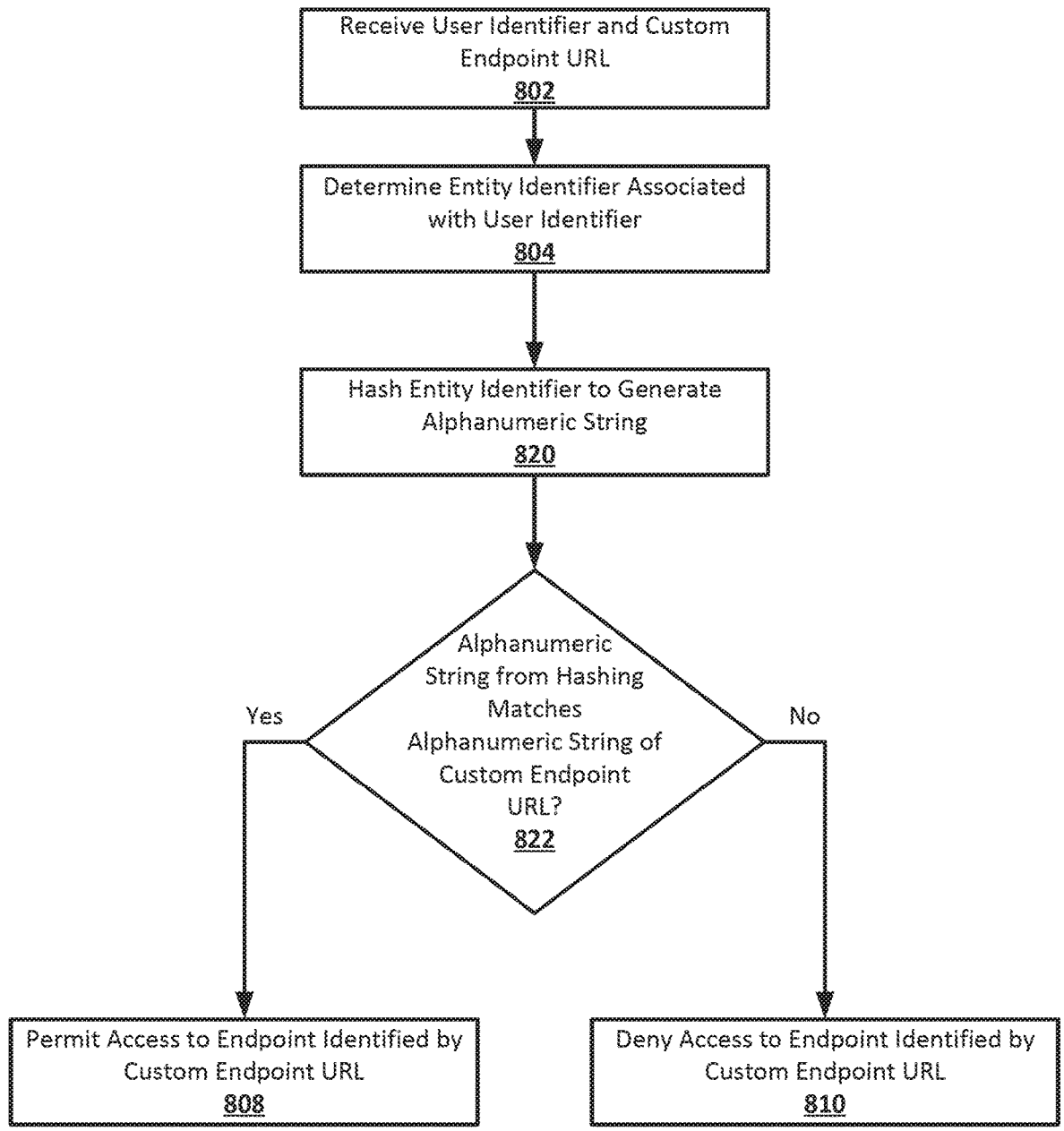
FIG. 8B shows an example procedure suitable for endpoint URL generation and management according to an implementation of the disclosed subject matter.

FIG. 8B shows an example procedure suitable for endpoint URL generation and management according to an implementation of the disclosed subject matter. At 802, a user identifier and custom endpoint URL may be received. For example, the endpoint access authenticator 510 may receive an endpoint access request from the entity computing device 200. The endpoint access request may include a user identifier and a custom endpoint URL for the endpoint to which access is being requested.

At 804, an entity identifier associated with the user identifier may be determined. For example, the endpoint access authenticator 510 may use the user databases 151, 161, and 171 in entity database 142 to determine which entity the user identifier belongs to and the entity identifier for that entity.

At 820, the entity identifier may be hashed to generate an alphanumeric string. For example, the entity identifier determined to be associated with the user identifier using the entity database 142 may be sent by the endpoint access authenticator 510 to be input to a cryptographic hashing algorithm by the Endpoint URL generator 110. The cryptographic hashing algorithm may output an alphanumeric string that may be of any suitable length.

At 822, if the alphanumeric string from hashing matches an alphanumeric string of the custom endpoint URL, flow may proceed to 808 where access to the endpoint identified by the custom endpoint URL may be permitted. Otherwise, flow may proceed to 810, where access to the endpoint identified by the custom endpoint URL may be denied. For example, the endpoint access authenticator 510 extract the alphanumeric string from the custom endpoint URL received as part of the endpoint access request from the entity computing device 200. The alphanumeric string generated by hashing the entity identifier associated with the user identifier may be compared to the alphanumeric string extracted from the custom endpoint URL received as part of the endpoint access request from the entity computing device 200 to determine whether they match.

At 808, access to the endpoint identified by the custom endpoint URL may be permitted. For example, the endpoint access authenticator 510 may have determined that the alphanumeric string generated by hashing the entity identifier associated with the user identifier matches the alphanumeric string extracted from the custom endpoint URL received as part of the endpoint access request from the entity computing device 200. This may indicate that the user identifier belongs to the same entity as the endpoint in the endpoint access request. If the proper password or other form of authentication is provided along with the user identifier by the entity computing device 200, the endpoint access authenticator 510 may permit the entity computing device 200 to access the endpoint that is identified by the custom endpoint URL that was sent in the endpoint access request.

At 810, access to the endpoint identified by the custom endpoint URL may be denied. For example, the endpoint access authenticator 510 may have determined that the alphanumeric string generated by hashing the entity identifier associated with the user identifier does not match the alphanumeric string extracted from the custom endpoint URL received as part of the endpoint access request from the entity computing device 200. This may indicate that the user identifier belongs to a different entity than the endpoint in the endpoint access request. The entity computing device 200 may not be permitted to access the endpoint identified by the custom endpoint URL.

Figure 9:
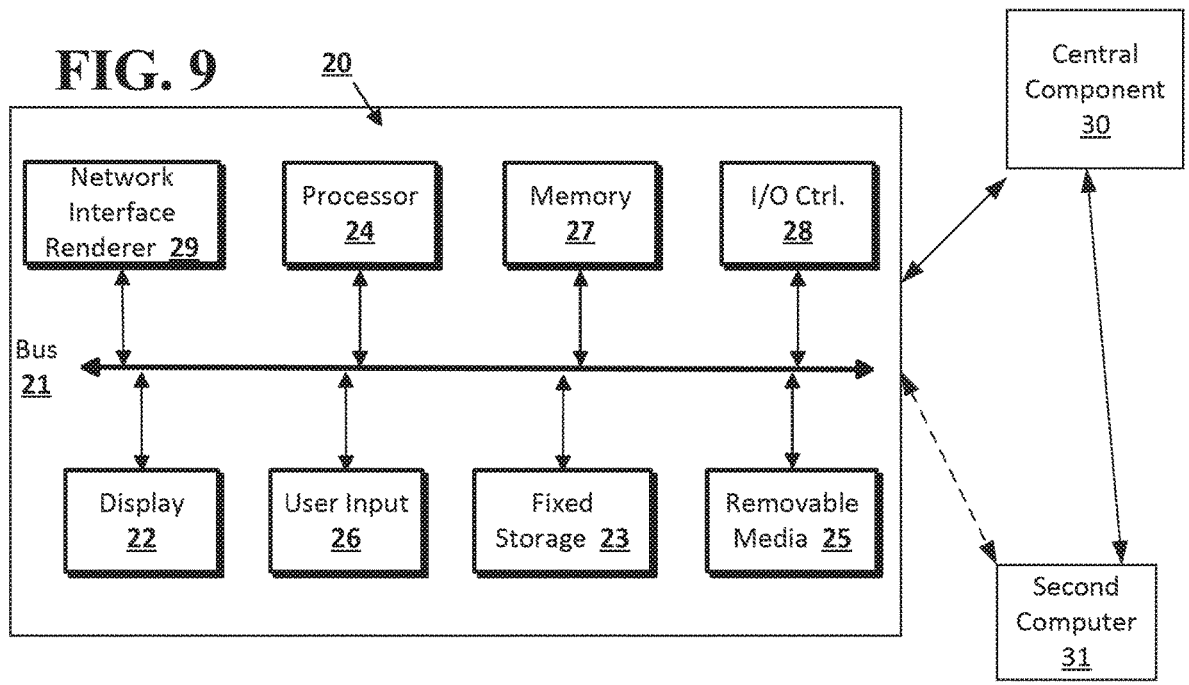
FIG. 9 shows a computer according to an implementation of the disclosed subject matter.

Implementations of the presently disclosed subject matter may be implemented in and used with a variety of component and network architectures. FIG. 9 is an example computer 20 suitable for implementing implementations of the presently disclosed subject matter. As discussed in further detail herein, the computer 20 may be a single computer in a network of multiple computers. As shown in FIG. 9, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touch-screen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 10.

Many other devices or components (not shown) may be connected in a similar manner (e.g., document scanners, digital cameras and so on). Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, removable media 25, or on a remote storage location.

Figure 10:
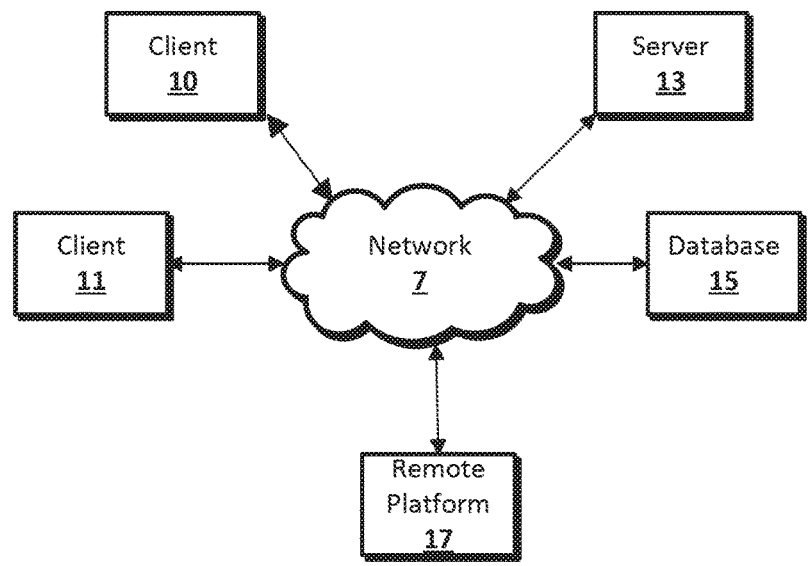
FIG. 10 shows a network configuration according to an implementation of the disclosed subject matter.

FIG. 10 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
receiving a first entity identifier that identifies a first entity of a plurality of entities, wherein the plurality of entities are organizations;
hashing, with a hashing algorithm, the first entity identifier to generate a first alphanumeric string;
generating a first custom endpoint URL (Uniform Resource Locator) by combining the first alphanumeric string with a first URL that identifies a first endpoint located in a first stack of a plurality of stacks of a cloud computing system, wherein the cloud computing system is segmented into the plurality of stacks, and wherein each of the plurality of stacks comprises its own subdomain;
updating a CNAME (Canonical Name) record in a DNS (Domain Name System) database to associate the first custom endpoint URL, with the first URL that identifies the first endpoint located in the first stack of the cloud computing system;
updating the CNAME record in the DNS database to associate the first custom endpoint URL, with a second URL that identifies the first endpoint in a second stack of the cloud computing system, in response to the first endpoint being moved from the first stack of the cloud computing system to the second stack of the cloud computing system, wherein the second URL includes subdomains that identify the second stack to which the first endpoint is moved;
receiving a first access request comprising a first user identifier and the first custom endpoint URL;
receiving a second entity identifier associated with the first user identifier by looking up the first user identifier in an entity database, wherein the second entity identifier identifies a second entity of the plurality of entities;
determining the first entity identifier being associated with the first custom endpoint URL in the first access request by looking up the first alphanumeric string of the first custom endpoint URL of the first access request in an endpoint-string database that associates alphanumeric strings with entity identifiers;
comparing the second entity identifier associated with the first user identifier of the first access request, with the first entity identifier associated with the first custom endpoint URL of the first access request;
determining if the second entity identifier associated with the first user identifier of the first access request, matches the first entity identifier associated with the first custom endpoint URL of the first access request;
permitting access to the first endpoint identified by the first custom endpoint URL if the second entity identifier associated with the first user identifier of the first access request matches the first entity identifier associated with the first custom endpoint URL of the first access request and not permitting access to the first endpoint identified by the first custom endpoint URL if the second entity identifier associated with the first user identifier of the first access request does not match the first entity identifier associated with the first custom endpoint URL of the first access request.

2. The computer-implemented method of claim 1, further comprising:
receiving a second access request comprising a second user identifier and the first custom endpoint URL;
determining a third entity identifier associated with the second user identifier;
hashing, with the hashing algorithm, the third entity identifier associated with the second user identifier to generate a second alphanumeric string; and
permitting access to the first endpoint identified by the first custom endpoint URL if the second alphanumeric string matches the first alphanumeric string of the first custom endpoint URL of the second access request and not permitting access to the first endpoint identified by the first custom endpoint URL if the second alphanumeric string does not match the first alphanumeric string of the first custom endpoint URL of the second access request.

3. The computer-implemented method of claim 1, wherein the first entity identifier is a number, and wherein the first alphanumeric string comprises more characters than there are digits of the number.

4. The computer-implemented method of claim 1, wherein the hashing algorithm is configured to generate alphanumeric strings that comply with DNS criteria.

5. The computer-implemented method of claim 1, further comprising:
receiving the first entity identifier a second time;
hashing, with the hashing algorithm, the first entity identifier to generate the first alphanumeric string; and
generating a second custom endpoint URL by combining the first alphanumeric string with a third URL that identifies a second endpoint located on a server of the cloud computing system.

6. The computer-implemented method of claim 1, further comprising:
receiving a fourth entity identifier;
hashing, with the hashing algorithm, the fourth entity identifier to generate a third alphanumeric string different from the first alphanumeric string; and
generating a third custom endpoint URL by combining the third alphanumeric string with a third URL that identifies a second endpoint located on a server of the cloud computing system.

7. A computer-implemented system for endpoint URL generation and management comprising:
a computer memory; and
a computer processor that receives a first entity identifier that identifies a first entity of a plurality of entities, wherein the plurality of entities are organizations,
hashes, with a hashing algorithm, the first entity identifier to generate a first alphanumeric string, generates a first custom endpoint URL by combining the first alphanumeric string with a first URL that identifies a first endpoint located in a first stack of a plurality of stacks of a cloud computing system, wherein the cloud computing system is segmented into the plurality of stacks, and wherein each of the plurality of stacks comprises its own subdomain, updates a CNAME (Canonical Name) record in a DNS (Domain Name System) database to associate the first custom endpoint URL, with the first URL that identifies the first endpoint located in the first stack of the cloud computing system, updates the CNAME record in the DNS database to associate the first custom endpoint URL, with a second URL that identifies the first endpoint in a second stack of the cloud computing system, in response to the first endpoint being moved from the first stack of the cloud computing system to the second stack of the cloud computing system, wherein the second URL includes subdomains that identify the second stack to which the first endpoint is moved, receives a first access request comprising a first user identifier and the first custom endpoint URL, receives a second entity identifier associated with the first user identifier by looking up the first user identifier in an entity database, wherein the second entity identifier identifies a second entity of the plurality of entities, determines the first entity identifier being associated with the first custom endpoint URL in the first access request by looking up the first alphanumeric string of the first custom endpoint URL of the first access request in an endpoint-string database that associates alphanumeric strings with entity identifiers, compares the second entity identifier associated with the first user identifier of the first access request, with the first entity identifier associated with the first custom endpoint URL of the first access request, determines if the second entity identifier associated with the first user identifier of the first access request, matches the first entity identifier associated with the first custom endpoint URL of the first access request, permits access to the first endpoint identified by the first custom endpoint URL if the second entity identifier associated with the first user identifier of the first access request matches the first entity identifier associated with the first custom endpoint URL of the first access request, and does not permit access to the first endpoint identified by the first custom endpoint URL if the second entity identifier associated with the first user identifier of the first access request does not match the first entity identifier associated with the first custom endpoint URL of the first access request.

8. The computer-implemented system of claim 7, wherein the computer processor further
receives a second access request comprising a second user identifier and the first custom endpoint URL,
determines a third entity identifier associated with the second user identifier,
hashes, with the hashing algorithm, the third entity identifier associated with the second user identifier to generate a second alphanumeric string, and
permits access to the first endpoint identified by the first custom endpoint URL if the second alphanumeric string matches the first alphanumeric string of the first custom endpoint URL of the second access request and not permitting access to the first endpoint identified by the first custom endpoint URL if the second alphanumeric string does not match the first alphanumeric string of the first custom endpoint URL of the second access request.

9. The computer-implemented system of claim 7, wherein the first entity identifier is a number, and wherein the first alphanumeric string comprises more characters than there are digits of the number.

10. The computer-implemented system of claim 7, wherein the hashing algorithm is configured to generate alphanumeric strings that comply with DNS criteria.

11. The computer-implemented system of claim 7, wherein the processor further
receives the first entity identifier a second time;
hashes, with the hashing algorithm, the first entity identifier to generate the first alphanumeric string, and
generates a second custom endpoint URL by combining the first alphanumeric string with a third URL that identifies a second endpoint located on a server of the cloud computing system.

12. The computer-implemented system of claim 7, wherein the processor further
receives a fourth entity identifier,
hashes, with the hashing algorithm, the fourth entity identifier to generate a third alphanumeric string different from the first alphanumeric string, and
generates a third custom endpoint URL by combining the third alphanumeric string with a third URL that identifies a second endpoint located on a server of the cloud computing system.

* * * * *